(12) United States Patent
Kim et al.

(10) Patent No.: US 7,440,779 B2
(45) Date of Patent: Oct. 21, 2008

(54) RADAR DETECTOR HAVING FUNCTION OF HANDS-FREE DEVICE

(75) Inventors: Dong Chul Kim, Yongin-si (KR); Jeong Hun Kim, Goyang-si (KR); Young Jip Kim, Namyangju-si (KR); Jong Yeon Kim, Seoul (KR); Jung Hyun Kim, Seoul (KR)

(73) Assignee: BG T & A Co., Seoul (KR)

( * ) Notice: Subject to any disclaimer, the term of this patent is extended or adjusted under 35 U.S.C. 154(b) by 486 days.

(21) Appl. No.: 11/299,770

(22) Filed: Dec. 13, 2005

(65) Prior Publication Data

US 2006/0139203 A1   Jun. 29, 2006

(30) Foreign Application Priority Data

Dec. 14, 2004   (KR) .................... 10-2004-0105460

(51) Int. Cl.
*H04M 1/00* (2006.01)
(52) U.S. Cl. .............. 455/569.1; 455/575.9; 455/556.1; 342/20
(58) Field of Classification Search ............... 455/569.1
See application file for complete search history.

(56) References Cited

U.S. PATENT DOCUMENTS 6,583,750 B2 *   6/2003   Shin ............................ 342/20

7,301,494 B2 *   11/2007   Waters ........................ 342/20

FOREIGN PATENT DOCUMENTS

KR   10-0299425   11/2001

\* cited by examiner

*Primary Examiner*—Lana N. Le
*Assistant Examiner*—Ajibola Akinyemi
(74) *Attorney, Agent, or Firm*—Finnegan, Henderson, Farabow, Garrett, & Dunner, L.L.P.

(57) ABSTRACT

A radar detector enabling hands-free communication over a mobile phone by connecting the mobile phone to the radar detector. The radar detector includes a horn antenna; a signal-processing unit (SPU) for detecting a signal received by the horn antenna; a laser module for receiving a laser signal; a central processing unit (CPU) for controlling the SPU; a pulse delay unit for delaying or sustaining a CPU pulse; a sweep voltage generator unit for driving the SPU; a warning unit for warning the detected signal; an audio amplifier controller connected to the CPU and the warning unit to amplify an audio signal; and a connecting unit installed to connect the audio amplifier controller with a mobile phone. The connecting unit includes a microphone, a switch for reception of a signal from the mobile phone, and a connection portion for connection to the mobile phone.

4 Claims, 4 Drawing Sheets

RADAR DETECTOR HAVING FUNCTION OF HANDS-FREE DEVICE

BACKGROUND OF THE INVENTION

1. Field of the Invention

The present invention relates to a radar detector having the function of a hands-free device, and more particularly, to a radar detector having the function of a hands-free device, wherein a mobile phone can be connected to the radar detector so that a user can talk over the phone in a hands-free manner using an additional function of the radar detector, without a need for mounting an additional hands-free device for conversation by the phone in a vehicle with the radar detector installed therein, thereby improving user's convenience.

2. Description of the Related Art

Recently, as the use of mobile phones has been tremendously expanded and vehicles have also been widely popularized, there are many cases where mobile phones are used during travel of the vehicles.

However, the use of a mobile phone during travel of a vehicle may produce a possibility of occurrence of a safety accident due to lowered concentration of a driver. Therefore, when a driver intends to use a mobile phone, he/she should very carefully use the phone while watching a forward area.

To solve such inconvenience, there has been invented a hands-free device allowing a driver to talk over a mobile phone without directly holding the mobile phone with his/her hand while the driver drives a vehicle.

Such a hands-free device is to allow a user to talk over a mobile phone with another person without holding the mobile phone with his/her hand, using a speaker or the like. FIG. 1 is a perspective view showing an example of a conventional hands-free device for a mobile phone, which can be used in a vehicle. The hands-free device comprises a cradle 12 on which a mobile phone 10 can be placed, and a hands-free main body 14 for controlling the execution of a hands-free function.

A speaker 18, a power cord 20 for use in receiving electric power supplied from a vehicle, a cord 22 connected to the cradle 12, and the like are connected to the hands-free main body 14.

The cradle 12 is installed at a position where a user can conveniently place the mobile phone 10 in a passenger room of the vehicle (for example, a position on an instrument panel in the vicinity of a driver's seat), and the cradle 12 and the mobile phone 10 placed on the cradle 12 are generally connected using a curl cord 16 that can be connected to and disconnected from the mobile phone 10.

Meanwhile, for safety of road traffic, many countries recently make efforts to secure safe travel of vehicles by means of various kinds of speed meters employing microwaves and laser, and by means of early safety-warning transceivers for informing various dangerous situations on roads.

Particularly, the use of such speed meters and detectors is legally permitted and about two million ones per year are newly used in the United State of America. The number of countries showing a tendency to legalize the use thereof is gradually increasing in the world.

As for the kinds of signals used in such speed meters and detectors, the following signals are used according to devices to be used.

Speed guns for detecting a vehicle speed to prevent a vehicle from overspeeding includes those utilizing Ko-BAND (9.900 GHz), X-BAND (20.525 GHz), Ku-BAND (13.450 GHz), K-BAND (24.150 GHz), SUPERWIDE Ka-BAND (widely distributed between 33.000 and 36.000 GHz), and laser (with a wavelength of 800 nm to 1100 nm). Safety alert systems for notifying road information to secure safe travel of vehicles transmit three types of information, i.e., railway crossing, under construction and emergency vehicle, using a frequency of 24.070 to 24.230 GHz. Safety warning systems transmit 64 types of coded information, such as foggy area, under construction, school zone, and speed reduction, using a frequency of 24.075 to 24.125 GHz. Such safety-related transmitting/receiving systems are gradually vitalized, show a tendency to be popularized in the world, and are expected to be greatly associated with a future intelligent transport system (ITS).

Such a radar detector for detecting a traffic-related signal roughly comprises a horn antenna, a signal-processing unit for detecting a signal received by the horn antenna, a laser module for receiving a laser signal, a central processing unit for controlling the detection of the signals by the signal-processing unit and the laser module, and a warning unit for notifying the detected signals. The radar detector receives signals in eights bands of Ko, X, VG2, Ku, K, SA, SWS and SUPERWIDE Ka, and outputs the received signals by means of an optimum method according to a user's situation, thereby assisting in user's safety driving.

When a signal is received through the horn antenna, the warning unit issues a warning for notifying the signal. To this end, the warning unit generally comprises a voice IC, a sound amplifier, a speaker and the like. If necessary, the central processing unit may directly process a sound and output it through the speaker.

Therefore, if the radar detector is installed in a vehicle, it may be considered that hardware capable of being used as a hands-free device is provided in the vehicle. However, an additional hands-free device should be installed to conveniently talk over a mobile phone. This causes problems in that additional costs are incurred, a front portion of a passenger room of the vehicle becomes messy due to the hands-free device and cables for connection of the hands-free device, and there may be a confusion of operation.

SUMMARY OF THE INVENTION

The present invention is conceived to solve the aforementioned problems. An object of the present invention is to provide a radar detector having the function of a hands-free device, wherein a user can talk over a mobile phone using an additional function of the radar detector, without a need for mounting an additional hands-free device for conversation by the phone in a vehicle with the radar detector installed therein, thereby improving user's convenience.

According to the present invention for achieving the object, there is provided a radar detector having the function of a hands-free device, comprising a horn antenna; a signal-processing unit for detecting a signal received by the horn antenna; a laser module for receiving a laser signal; a central processing unit for controlling the signal-processing unit by generating a pulse to measure and calculate the period and width of the signal detected by the signal-processing unit, to analyze and output the bandwidth and information of the signal, and to find the type and information of the signal over time; a pulse delay unit for delaying or sustaining the pulse received from the central processing unit; a sweep voltage generator unit for driving the signal-processing unit by generating a voltage from the pulse delay unit; a warning unit for audibly or visually warning the detected signal; an audio amplifier controller connected to the central processing unit and the warning unit to amplify an audio signal; and a mobile phone connecting unit installed to connect the audio amplifier controller with a mobile phone and including a microphone, a switch for reception of a signal from the mobile phone, and a connection portion for connection to the mobile phone.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE INVENTION

Hereinafter, a preferred embodiment of the present invention will be described in detail with reference to the accompanying drawings.

Figure 1:
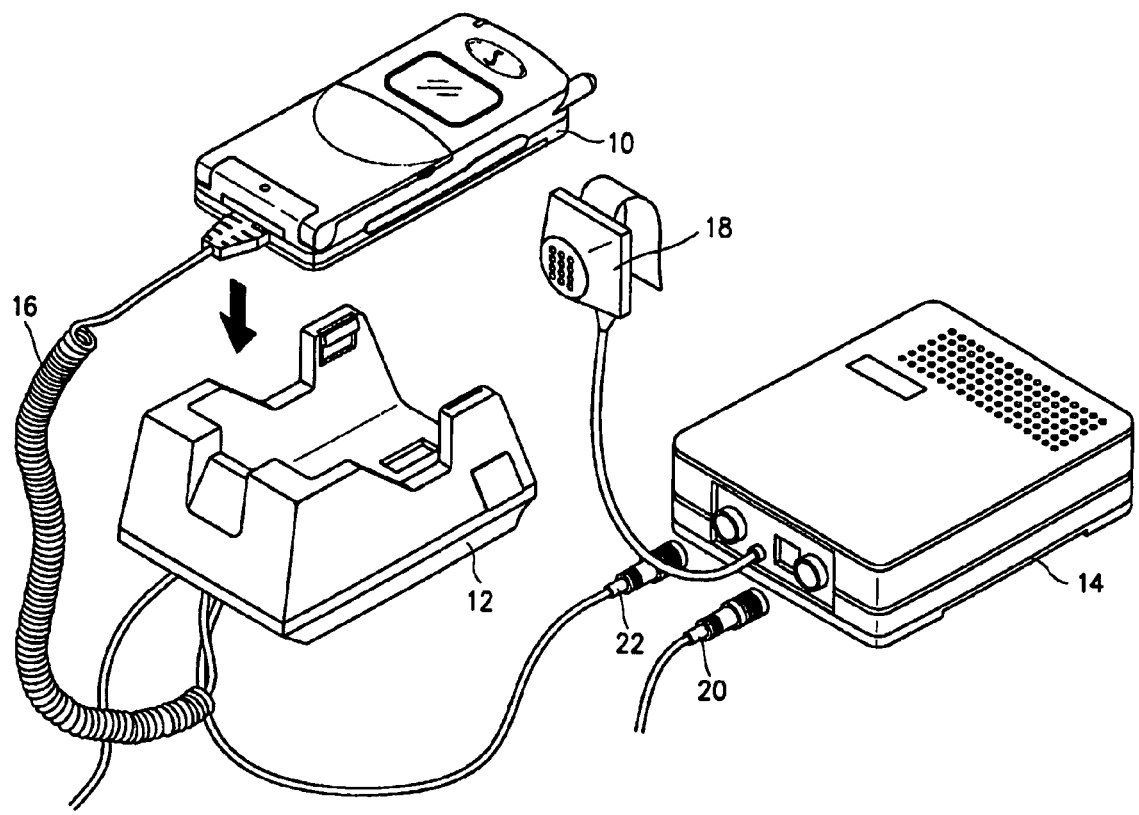
FIG. 1 is a perspective view showing an example of a conventional hands-free device for a mobile phone, which can be used in a vehicle.
Figure 2:
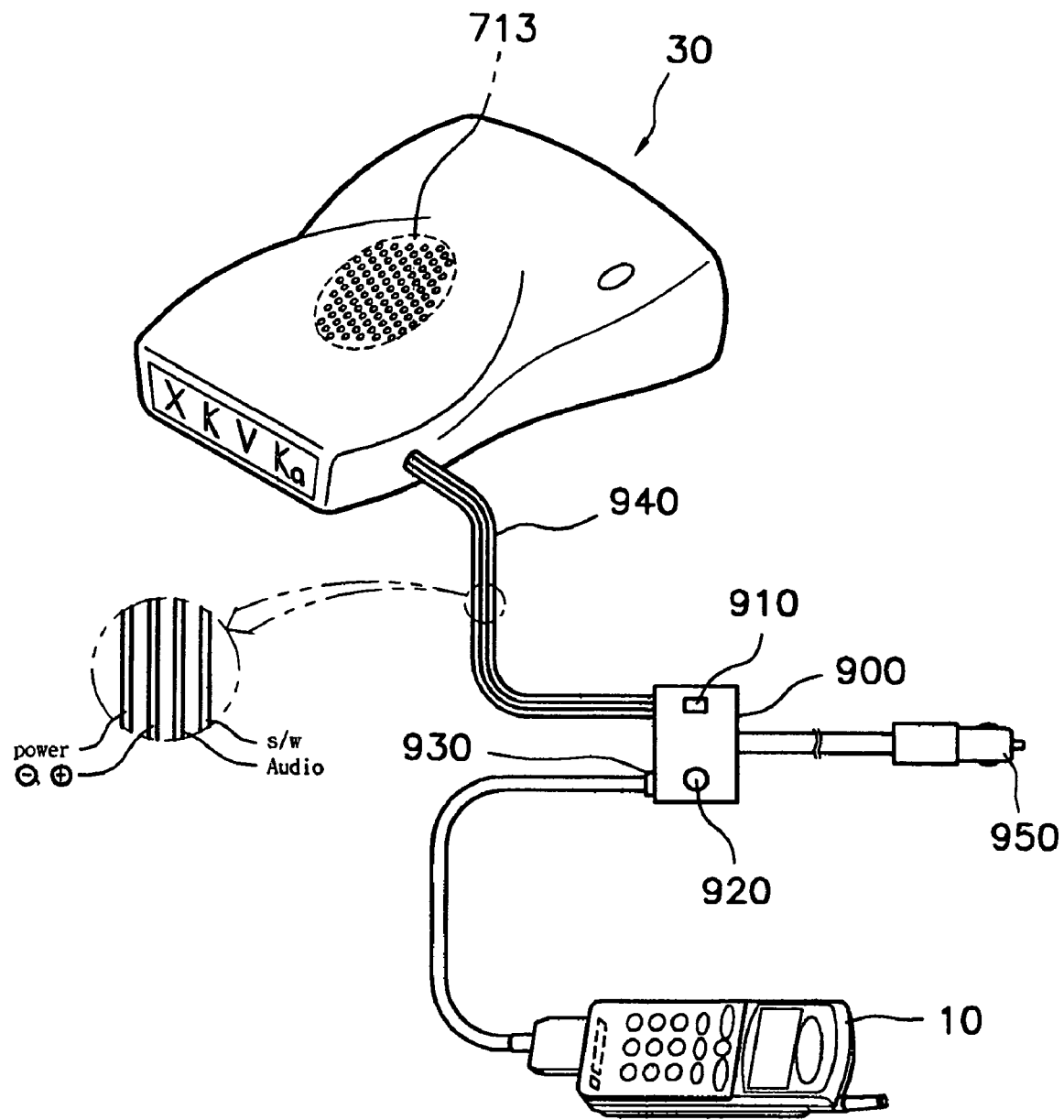
FIG. 2 is a perspective view showing a radar detector having the function of a hands-free device according to an embodiment of the present invention.
Figure 3:
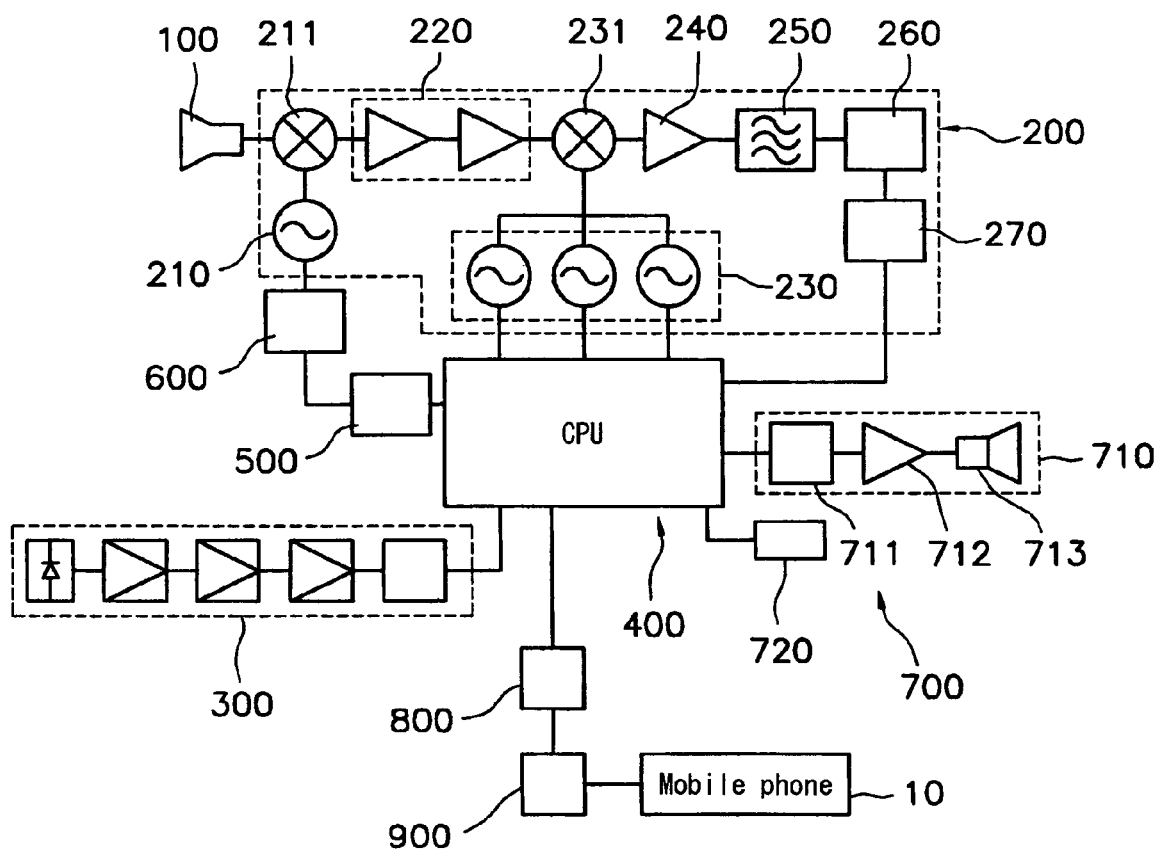
FIG. 3 is a detailed block diagram of the radar detector having the function of a hands-free device according to the embodiment of the present invention.

FIG. 2 is a perspective view showing a radar detector having the function of a hands-free device according to an embodiment of the present invention, and FIG. 3 is a detailed block diagram of the radar detector having the function of a hands-free device according to the embodiment of the present invention. The radar detector comprises a horn antenna 100; a signal-processing unit 200 for detecting a signal received by the horn antenna 100; a laser module 300 for receiving a laser signal; a central processing unit 400 for controlling the signal-processing unit 200 by generating a pulse to measure and calculate the period and width of the signal detected by the signal-processing unit 200, to analyze and output the bandwidth and information of the signal, and to find the type and information of the signal over time; a pulse delay unit 500 for delaying or sustaining the pulse received from the central processing unit 400; a sweep voltage generator unit 600 for driving the signal-processing unit 200 by generating a voltage from the pulse delay unit 500; a warning unit 700 for audibly or visually warning the detected signal; an audio amplifier controller 800 connected to the central processing unit 400 and the warning unit 700 to amplify an audio signal; and a mobile phone connecting unit 900 installed to connect the audio amplifier controller 800 with a mobile phone 10 and including a microphone 910, a switch 920 for reception of a signal from the mobile phone, and a connection portion 930 for connection to the mobile phone.

As shown in FIG. 2, the mobile phone connecting unit 900 is preferably further provided with a power connection portion 950 that is to be connected to a cigar socket (not shown) of a vehicle to receive electric power, thereby receiving electric power for a main body 30 of the radar detector through the vehicle. At this time, electric power can also be supplied to the mobile phone 10 connected to the mobile phone connecting unit 900.

Figure 4:
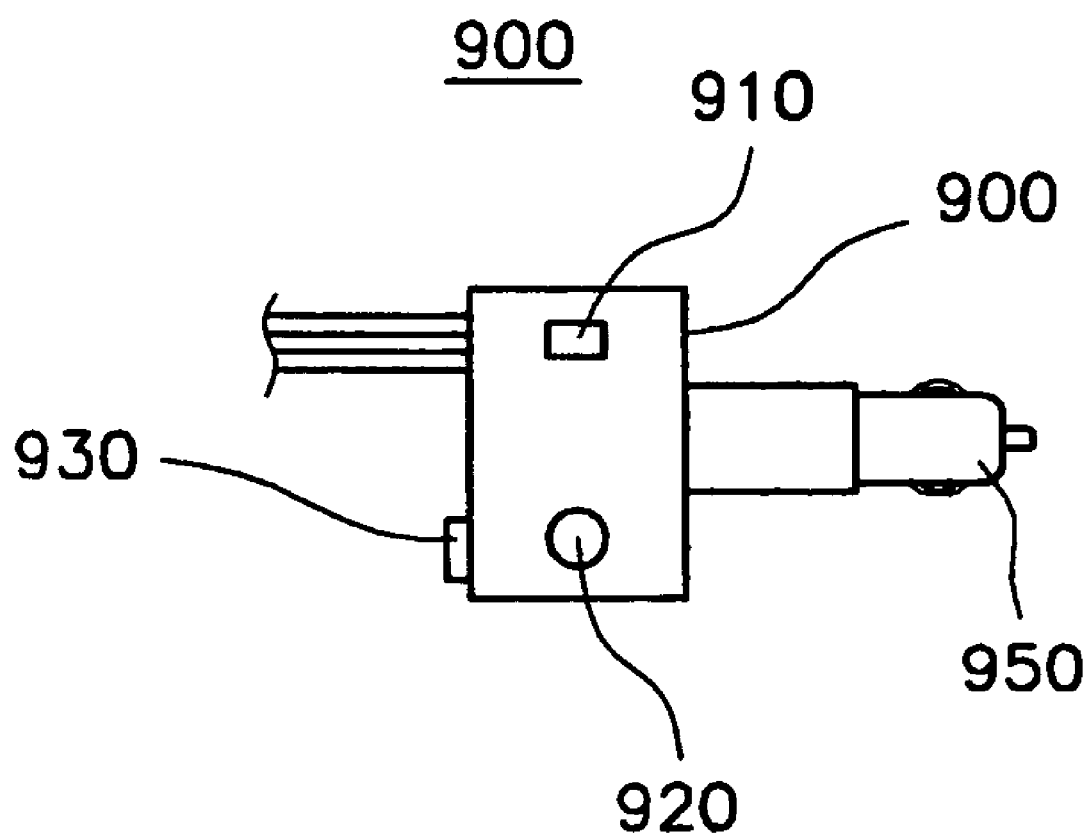
FIG. 4 is a schematic view showing a variant of a mobile phone connecting unit of the radar detector having the function of a hands-free device according to the embodiment of the present invention.

Although the power connection portion 950 can be connected to the body of the mobile phone connecting unit 900 through an electrical wire, for the sake of simplification of its structure, it may be formed integrally with the body of the mobile phone connecting unit 900, as shown in FIG. 4.

As shown in FIG. 3, the signal-processing unit 200 comprises a first local oscillator section 210 constituting an oscillator cavity enabling oscillation in a wide range of frequency band so as to oscillate a frequency of several tens GHz; a first amplifier section 220 for amplifying an oscillation signal of the first oscillator section 210 that has been mixed within a first mixer section 211; a second local oscillator section 230 for individually oscillating two or three frequencies and capable of continuously and alternately performing oscillation irrespective of the presence of a received signal; a second amplifier section 240 for amplifying an oscillation signal of the second local oscillator section 230 that has been mixed within a second mixer section 231; a filter section 250 for selectively passing the signal amplified by the second amplifier section 240; a demodulator section 260 for detecting the signal that has passed through the filter section 250; and an AD converter section 270 for converting the detected signal into a digital signal.

Further, the warning unit 700 is roughly divided into an audio output section 710 and a visual output section 720. The audio output section 710 comprises a voice IC 711, a sound amplifier 712, and a speaker 713.

Since the detailed structure and operation of the signal-processing unit 200 are the same as the invention disclosed in Korean Patent No. 0299425, which was filed in the name of and issued to the applicant of the present application, a description of the operational relationship thereof will be omitted.

Meanwhile, when a user manipulates the switch 920 of the mobile phone connecting unit 900 in order to use the mobile phone 10, the audio amplifier controller 800 performs control such that a sound from the mobile phone 10 can be outputted through the speaker 713 of the audio output section 710 of the warning unit 700, and a voice of the user can be input into the mobile phone 10 through the microphone 910 of the mobile phone connecting unit 900.

Hereinafter, the operation and effects of the present invention will be described with reference to FIGS. 2 to 4.

As shown in FIG. 2, the present invention is characterized in that the radar detector can be used as a hands-free device by connecting the mobile phone 10 to the main body 30 of the radar detector through the mobile phone connecting unit 900 to use the audio amplifier controller 800, the central processing unit 400, and the audio output section 710 of the warning unit 700 of the radar detector.

For this configuration, a connecting cable 940 for connecting the main body 30 of the radar detector to the mobile phone connecting unit 900 comprises electrical wires for use in controlling a power supply, electrodes, audios and switches.

Upon use of the radar detector of the present invention, the mobile phone 10 and the main body 30 of the radar detector are first placed on respective cradles (not shown). Then, the mobile phone connecting unit 900 is placed in the vicinity of a cigar socket of a vehicle if the power connection portion 950 is formed integrally with the body of the mobile phone connecting unit 900, or installed to easily transmit a user's voice if the power connection portion is formed separately from the body of the mobile phone connecting unit.

The main body 30 of the radar detector receives electric power through the power connection portion 950 as described above, and may also function to electrically charge the mobile phone 10 if an additional regulator is installed.

When the user receives a call on the mobile phone 10 in such an installed state, the user can start to answer the mobile phone or terminate the call by manipulating the switch 920 of the mobile phone connecting unit 900. It is possible to talk over the phone through the microphone 910 of the mobile phone connecting unit 900 and the speaker 713 of the audio output unit 710 installed at the main body 30 of the radar detector. According to the present invention, there is an advantage in that it is possible to provide a radar detector having the function of a hands-free device, wherein a user can talk over a mobile phone using an additional function of the radar detector, without a need for mounting an additional hands-free device for conversation by the phone in a vehicle with the radar detector installed therein, thereby improving user's convenience.

The embodiment is an example specifically illustrating the technical spirit of the present invention, and the scope of the present invention is not limited to the drawings and the embodiment.

What is claimed is:

1. A radar detector having the function of a hands-free device, comprising:
    a horn antenna;
    a signal-processing unit for detecting a signal received by the horn antenna;
    a laser module for receiving a laser signal;
    a central processing unit for controlling the signal-processing unit by generating a pulse to measure and calculate the period and width of the signal detected by the signal-processing unit, to analyze and output the bandwidth and information of the signal, and to find the type and information of the signal over time;
    a pulse delay unit for delaying or sustaining the pulse received from the central processing unit;
    a sweep voltage generator unit for driving the signal-processing unit by generating a voltage from the pulse delay unit;
    a warning unit for audibly or visually warning the detected signal;
    an audio amplifier controller connected to the central processing unit and the warning unit to amplify an audio signal from the warning unit and an audio signal from a mobile phone; and
    a mobile phone connecting unit installed to connect the audio amplifier controller with the mobile phone and including a microphone, a switch for reception of a signal from the mobile phone, and a connection portion for connection to the mobile phone.

2. The radar detector as claimed as claim 1, wherein the signal-processing unit comprises:
    a first local oscillator section integrally installed at a side of the horn antenna;
    a first amplifier section for amplifying a signal obtained by mixing all signals received by the horn antenna with a first local frequency generated by the first local oscillator section within a first mixer section;
    a second local oscillator section with two or three oscillators for oscillating individual frequencies;
    a second amplifier section for amplifying a signal obtained by mixing the signal amplified by the first amplifier section with a second local frequency generated by the second local oscillator section within a second mixer section;
    a filter section for selectively passing the signal amplified by the second amplifier section;
    a demodulator section for detecting the signal that has passed through the filter section; and
    an AD converter section for converting the detected signal into a digital signal.

3. The radar detector as claimed as claim 1, wherein the mobile phone connecting unit is further provided with a power connection portion that is to be connected to a cigar socket of a vehicle to receive electric power.

4. The radar detector as claimed as claim 1, wherein if a user manipulates the switch of the mobile phone connecting unit in order to use the mobile phone, the audio amplifier controller performs control such that a sound from the mobile phone can be outputted through the warning unit, and a voice of the user can be input into the mobile phone through the microphone of the mobile phone connecting unit.

* * * * *